United States Patent [19]
Newman

[11] Patent Number: 6,119,564
[45] Date of Patent: Sep. 19, 2000

[54] ADJUSTABLE GRINDING SUPPORT AND GRINDING SUPPORT ASSEMBLY USING SAME

[75] Inventor: Paul Clayton Newman, Edgewood, Md.

[73] Assignee: Maryland Lava Company, Bel Air, Md.

[21] Appl. No.: 09/081,766

[22] Filed: May 21, 1998

[51] Int. Cl.[7] .................................................. B23B 13/02
[52] U.S. Cl. .......................................... 82/162; 451/252
[58] Field of Search ..................................... 451/408, 381, 451/385, 398, 397, 252, 218, 142; 82/162, 164; 269/289 MR

[56] References Cited

U.S. PATENT DOCUMENTS

| | | | |
|---|---|---|---|
| 975,088 | 11/1910 | Thompson . | |
| 2,068,915 | 1/1937 | Hardin | 51/219 |
| 2,396,450 | 3/1946 | Walling | 51/216 |
| 2,939,253 | 6/1960 | Richard et al. | 51/103 |
| 2,952,953 | 9/1960 | Livingston | 51/238 |

*Primary Examiner*—Joseph J. Hail, III
*Assistant Examiner*—Dermott J. Cooke

[57] ABSTRACT

A grinding support for supporting a workpiece, such as a pin member, during a process of grinding the workpiece. The support particularly supports the workpiece in a stable position during grinding so that larger grinding "cuts" can be taken, thereby speeding the process. In addition, the positioning of the support can be precisely controlled to ensure a consistent grind along the length of the workpiece. The grinding support may be used in a grinding support assembly in which a workpiece is supported at one end thereof by the aforementioned support, and at another end by a known type of support, the latter preferably being rotatable, whereby the workpiece can be rotated during the grinding process.

14 Claims, 4 Drawing Sheets

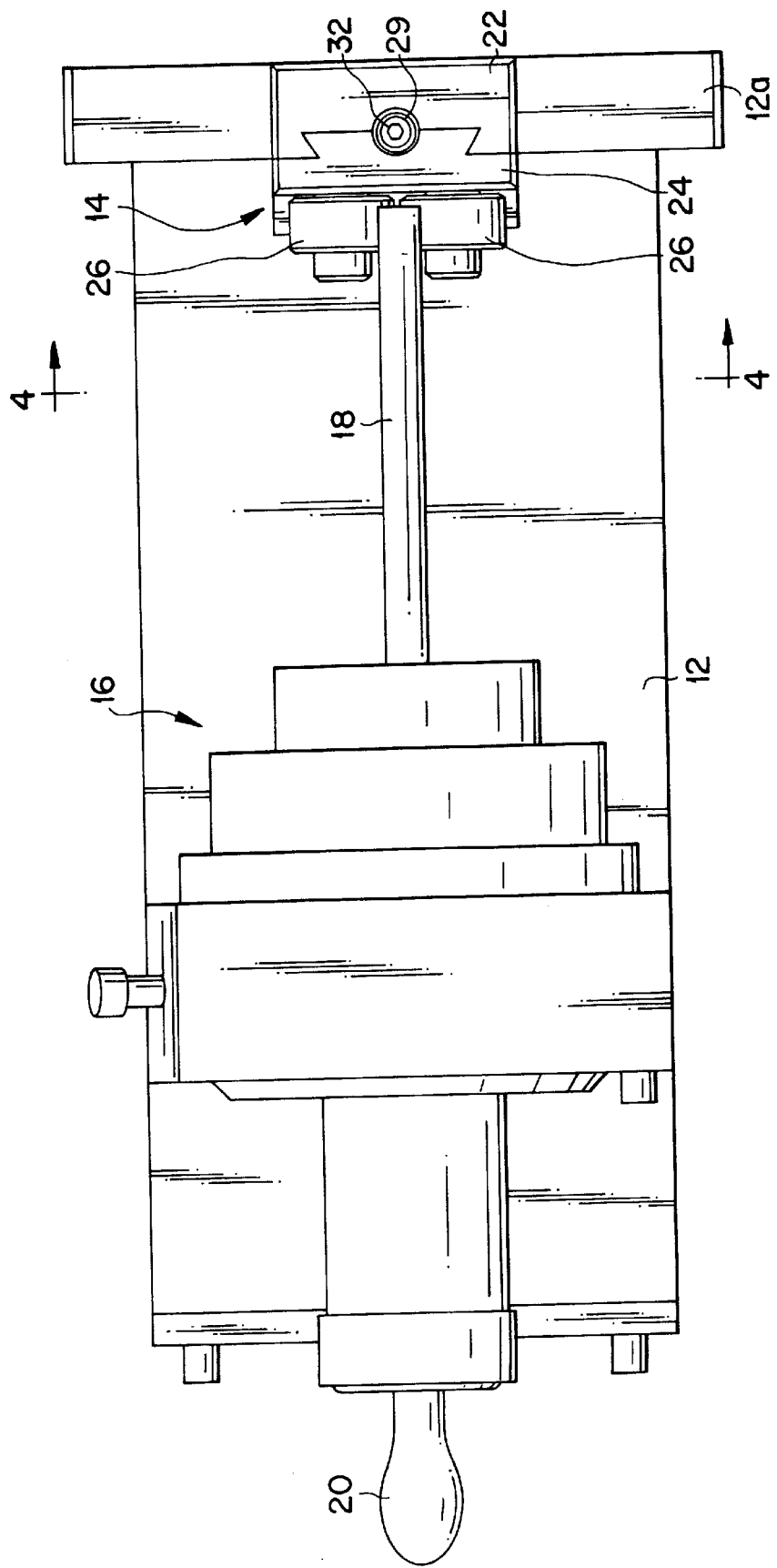

ADJUSTABLE GRINDING SUPPORT AND GRINDING SUPPORT ASSEMBLY USING SAME

BACKGROUND OF THE INVENTION

1. Field of the Invention

The present invention relates to a grinding support for supporting a portion of a workpiece during a grinding process, and particularly, to a grinding support for supporting a round member, like a pin, during a grinding process. The present invention is also directed to a grinding support assembly utilizing such a support.

2. Description of Related Art

It is conventionally known to use pin members, their diameters being custom-adjusted by grinding, in injection molds, extrusion dies, and the like.

Such grinding has been conventionally performed by mounting a pin member at one end, leaving the other end free, and grinding the pin member using a conventional grinding tool, like an abrasive grinding wheel.

However, this approach causes problems which lead to, among other things, inefficiency, poor results, and slow processing.

For example, when the grinding wheel contacts the pin member mounted only at one end, as discussed above, the frictional contact tends to make the pin member flutter or chatter relative to the grinding wheel. This causes poor or inaccurate grinding, since contact between the grinding wheel and the pin member cannot be consistently controlled. One conventional solution is to make only light contact between the grinding wheel and the pin member, but this makes the process more inefficient because only small grinding "cuts" are then possible so that it takes longer to achieve the desired level of grinding. Another conventional solution is to use generic support blocks or the like to support the free end of the pin member during grinding. It will be appreciated, however, that precisely supporting both ends of the pin member is not generally possible since such support blocks typically have varying dimensions. This can cause the pin member to be tilted during grinding, which causes an undesirable variation in the grind along the length of the member.

SUMMARY OF THE INVENTION

In view of the foregoing, it is an objective of the present invention to provide a grinding support for supporting a workpiece (such as a pin member) while it is being ground by a grinding tool, as well as a grinding support assembly utilizing such a support. This beneficially eliminates chattering during grinding, permits larger cuts (i.e., grinding passes) (which speeds the grinding, process), and more precisely supports the workpiece compared to using randomly-sized support blocks and the like.

It is also an objective of the present invention to provide a grinding support and a grinding support assembly, as discussed above, in which use, including adjustment, thereof is very convenient, which also enhances processing speed and production efficiency.

Therefore, a grinding support according to the present invention characteristically includes:

a first sub-support;

a second sub-support mounted on the first sub-support and being slidably movable relative to the first sub-support along a vertical direction;

a pair of adjacently mounted rollers mounted on the second sub-support and arranged so as to define a crevice or groove therebetween; and a mechanism for adjusting the height of the second sub-support relative to the first sub-support.

In the grinding support, as set forth above, an end portion of the workpiece (which, conventionally, is either left freely extending or supported by randomly-sized support blocks, as discussed above) is restingly supported in the crevice defined between the rollers provided on the second sub-support. This provides support for the workpiece against vertical (typically, downward) movement as well as lateral movement. In particular, this helps overcome the problem of chattering, as discussed above.

A grinding support assembly according to the present invention comprises the grinding support, as described above, mounted on a base to support one end of a workpiece, along with a second support mounted on the base to support the other end of the workpiece. The second support is preferably adapted to permit rotation of the workpiece, so that the workpiece may be rotated while a grinding wheel or the like is applied. In addition, the grinding support according to the present invention may additionally be laterally adjustable, relative to the second support.

BRIEF DESCRIPTION OF THE DRAWINGS

The present invention will become more fully understood from the detailed description given hereinbelow and the accompanying drawings which are given by way of illustration only, and thus are not limitative of the present invention and wherein:

FIG. 3 is a top view of the assembly shown in FIG. 1;

DETAILED DESCRIPTION OF THE PREFERRED EMBODIMENTS

The foregoing and other objectives of the present invention will become more apparent from the detailed description given hereinafter. However, it should be understood that the detailed description and specific examples, details, etc., given hereinbelow, while indicating preferred embodiments of the invention, are given by way of illustration only, since various changes and modifications within the spirit and scope of the invention will become apparent to those skilled in the art from this detailed description.

The present invention will be described hereinbelow with reference to the drawings appended hereto.

Figure 1:
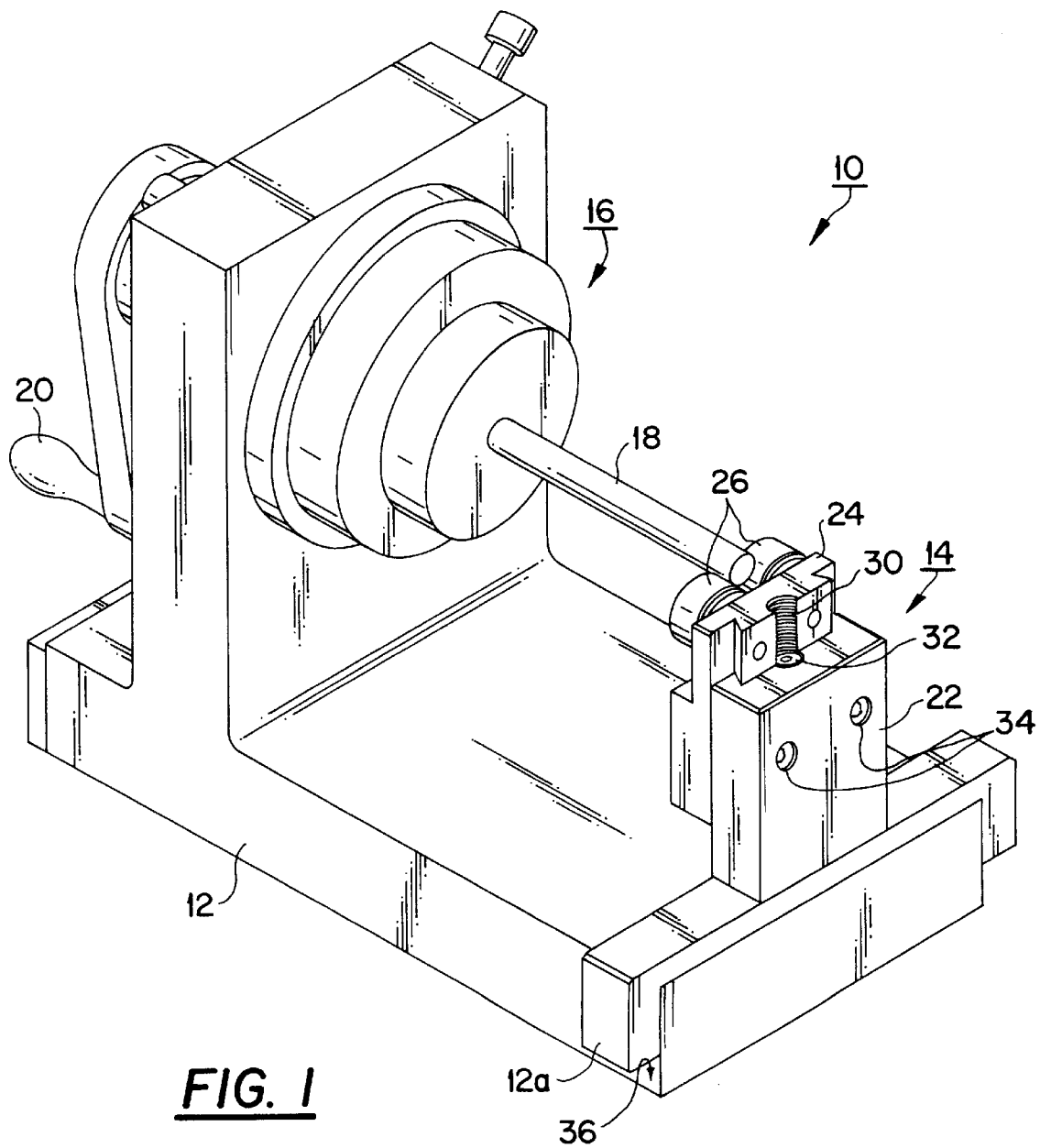
FIG. 1 is a perspective view of a grinding support assembly according to the present invention.
Figure 2:
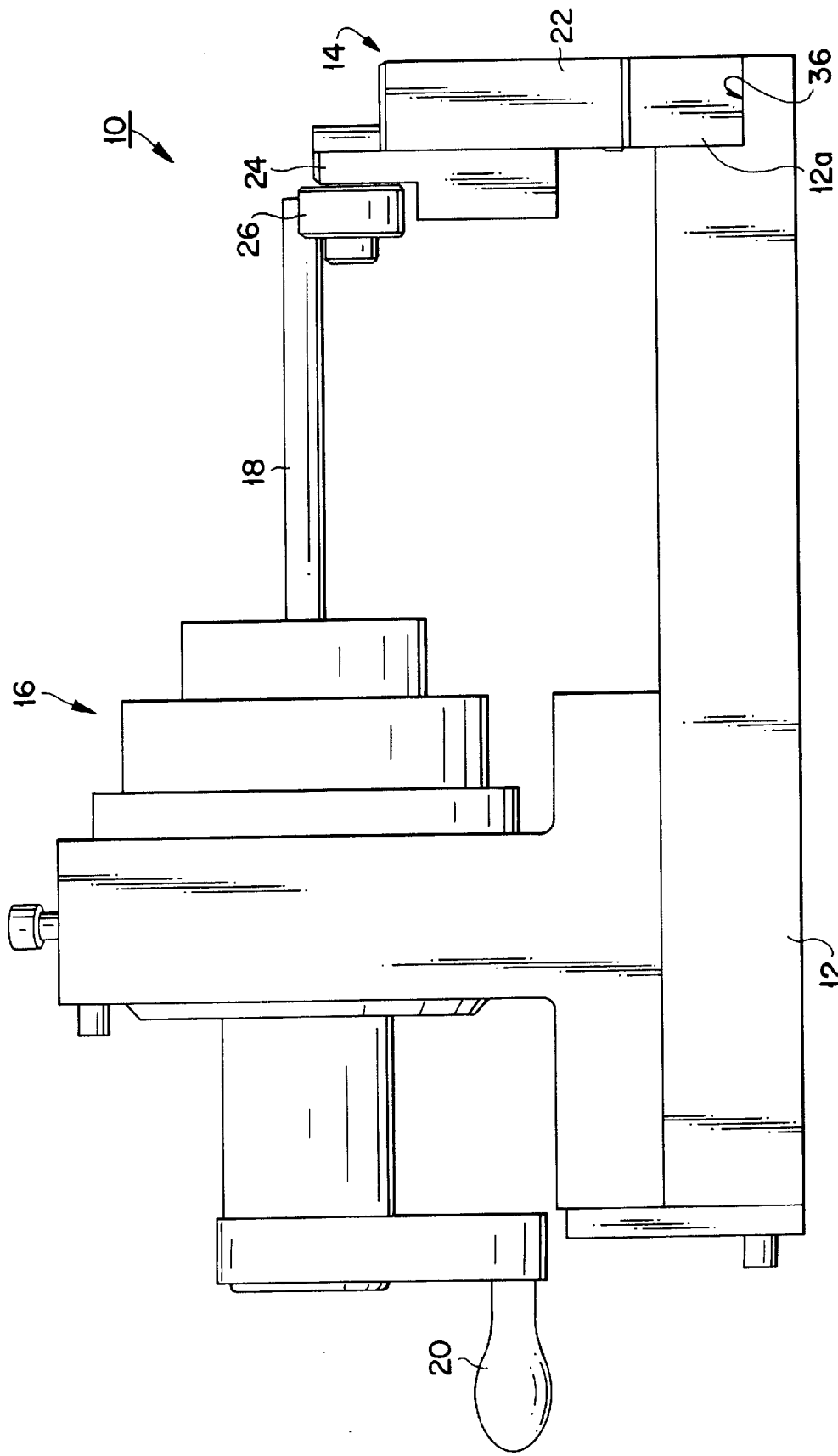
FIG. 2 is a front elevational view of the assembly shown in FIG. 1.
Figure 5:
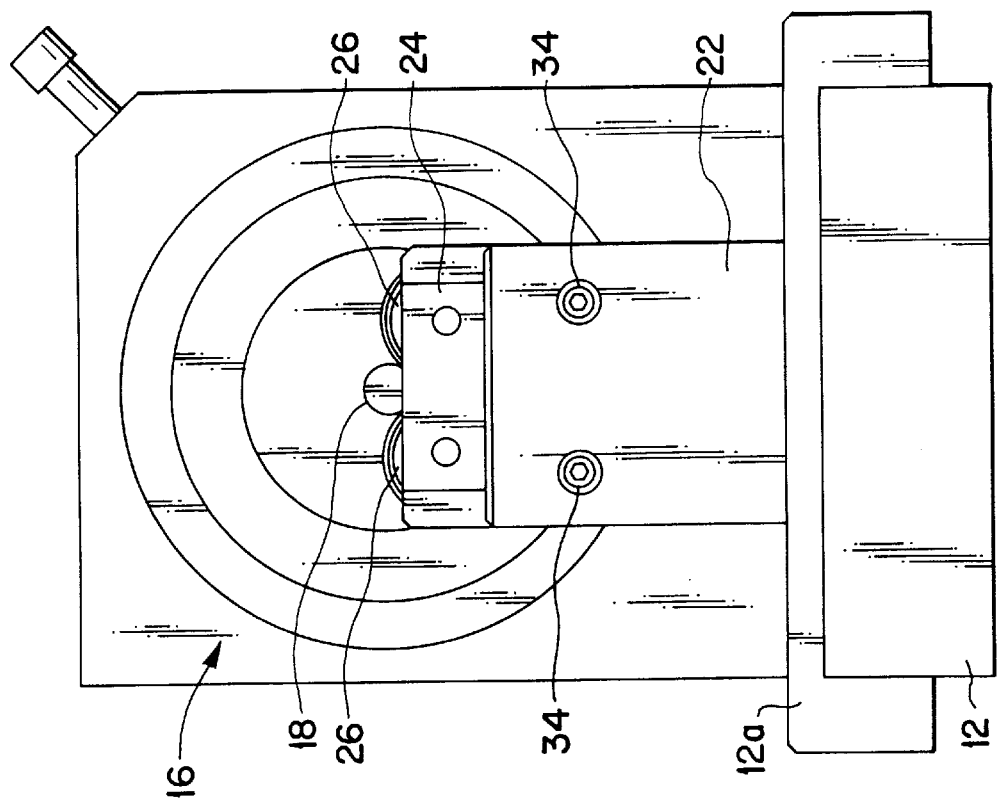
FIG. 5 is a right end view of the assembly shown in FIG. 1.
Figure 4:
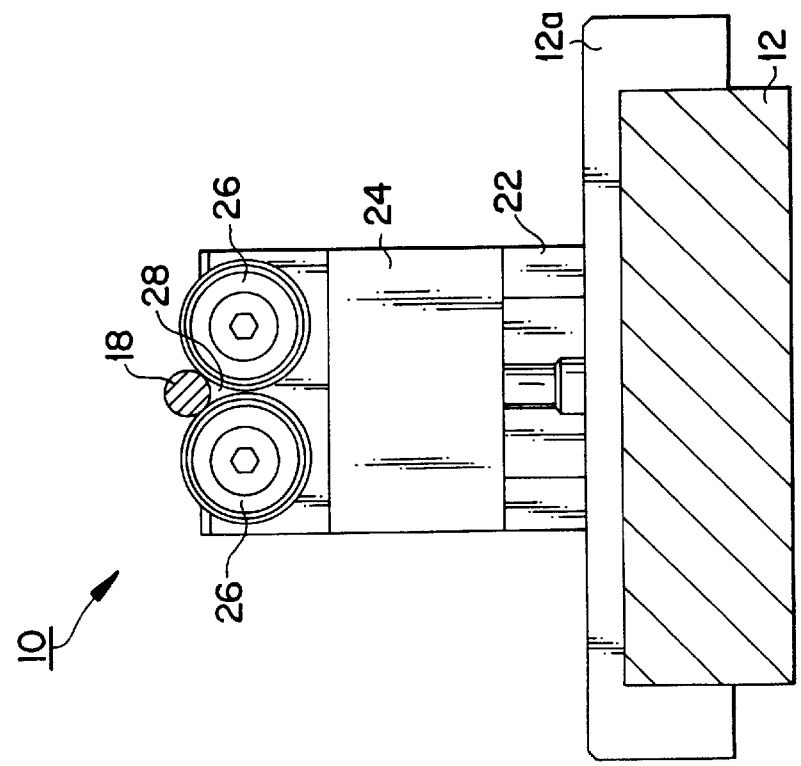
FIG. 4 is a sectional view taken along line 4—4 in FIG. 3.

As mentioned above, FIGS. 1–5 are various views of a grinding support assembly 10 according to the present invention. Assembly 10 includes a base 12 on which a first support 14 and a second support 16 are mounted. First and second supports 14, 16 support respective ends of a workpiece, such as pin member 18 which is, for example, round in cross-section.

Although not shown, it is useful to provide base 12 with a mounting whereby the assembly 10 may be easily moved towards and away from a grinding tool (e.g., a grinding wheel) apparatus (not shown). Such a mounting may include, for example, a T-shaped projection mounted on an underside of base 12 which is slidingly engaged with a corresponding slot on a work table on which the grinding tool apparatus is provided. Air bearings or a sliding collar/rod arrangement could also be used, for example.

First support 14 includes a first sub-support 22 mounted on base 12 and a second sub-support 24 slidingly mounted on first sub-support 22. More specifically, second sub-support 24 is slidingly movable along a vertical direction relative to first sub-support 22, whereby its height is variable.

Second sub-support 24 includes a pair of adjacently mounted roller members 26, 26 mounted thereon, preferably in a rotatable manner. Rollers 26, 26 therefore define a crevice or groove 28 therebetween, into which a first end of pin member 18 is restingly supported, as seen particularly in FIGS. 1–4. In this manner, pin member is not only supported against movement in a vertical direction (i.e., downwardly, presuming a grinding wheel is put in contact with pin member 18 from above), but is also at least somewhat supported against movement in a lateral direction (note the manner in which pin member is "nestled" between rollers 26, 26 (see, especially, FIG. 4)).

Movement of second sub-support 24 relative to first sub-support 22 can be adjusted by a height adjustment mechanism that is preferably simple in construction and operation. For example, a bore 29 may be formed along a plane at which respective faces of first sub-support 22 and second sub-support oppose one another. Therefore, bore 29 is partly defined by a portion of first sub-support 22 and partly defined by a portion of second sub-support 24 (see, especially, FIG. 1). Bore 29 is provided with screw threads 30 only on the portion of the second sub-support 24. This type of height adjustment mechanism also includes a screw, such as an Allen head screw 32, which is rotatable, but fixed (not shown) against axial movement relative to first sub-support 22 in a known manner.

Accordingly, with the foregoing arrangement, rotation of screw 32 drives second sub-support 24 upwardly or downwardly relative to first sub-support 22. Preferably, screw threads 30 have a pitch that is sufficiently small to permit very small (and, therefore, precise) vertical adjustments of the position of second sub-support 24 in relation to rotation of screw 32.

First sub-support 22 is provided with at least one locking mechanism for locking the relative position of first sub-support 22 and second sub-support 24. This locking mechanism may be, for example, at least one set screw 34 threadedly extending through first sub-support 22 and which can be tightened so as to press against second sub-support 24. Any other known and easy to operate locking mechanism may be employed as part of the present invention, as contemplated.

In order to permit lateral adjustment of the position of first support 14 relative to second support 10, base 12 may include a subportion 12*a* on which first sub-support 22 is mounted, and which is, for example, laterally slidable within a groove 36 defined in the major portion of base 12. Subportion 12*a* is preferably positionally lockable relative to base 12, using any known means (not shown), such as set screws in the manner discussed hereinabove.

Pin member 18 is, for example, insertingly mounted in second support 16 as illustrated. However, the structural details of the manner in which pin member 18 is mounted in second support 16 are non-critical to the present invention and specific illustrative detail(s) is/are therefore omitted in the drawings. Second support 16 may, for example, have a structure similar to a drill bit chuck on a conventional power hand drill, in which a drill bit is mounted in a bore and secured therein by tightening a collar or the like with an Allen wrench key or by screw-tightening an exterior, coaxial collar.

Second support 16 is preferably rotatably mounted so as to permit rotation of the pin member 18 during a grinding operation so that a periphery of the pin member is evenly ground. The mounting of second support 16 may therefore be suitably provided with roller bearings or the like (not illustrated) in a conventional manner in order to facilitate rotation of second support 16. Second support 16 is therefore also preferably provided with a driving mechanism to cause second support 16 to rotate. The driving mechanism may be, for example, a manual hand crank 20 as illustrated herein. The driving mechanism may alternatively be a motor or the like (not shown).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A grinding support assembly for supporting a workpiece having a first end and a second end, comprising:
    a base;
    a first support mounted on said base and comprising:
        a first sub-support mounted on said base;
        a second sub-support slidably mounted on said first sub-support along a vertical direction;
        a pair of adjacently mounted rollers mounted on said second sub-support, said pair of rollers defining a crevice therebetween in which the first end of the workpiece is restingly supported against downward and lateral movement; and
        a height adjustment mechanism constructed and arranged to permit a height of said second sub-support to be adjusted relative to said first sub-support; and
    a second support mounted on said base and constructed and arranged to support the second end of the workpiece.

2. The assembly as claimed in claim 1, wherein said second support is rotatably mounted.

3. The assembly as claimed in claim 2, further comprising a driving mechanism for rotatably driving said second support.

4. The assembly as claimed in claim 3, wherein said driving mechanism is a hand crank.

5. The assembly as claimed in claim 1, wherein said first support further comprises a locking mechanism constructed and arranged to lock said second sub-support relative to said first sub-support.

6. The assembly as claimed in claim 5, wherein said locking mechanism comprises at least one set screw.

7. The assembly as claimed in claim 1, wherein said height adjustment mechanism comprises a screw disposed in a bore defined partly by a portion of said first sub-support and partly by a portion of said second sub-support, said portion of said second sub-support having threads engaged with said screw, said screw being axially fixed relative to said first sub-support.

8. The assembly as claimed in claim 1, wherein said base includes a laterally movable subportion on which said first support is mounted, whereby a lateral position of said first support is adjustable relative to said second support.

9. A support for supporting a portion of a workpiece during a process of grinding the workpiece, comprising:

a first sub-support;

a second sub-support mounted on said first sub-support so as to be movable relative thereto along a vertical direction;

a pair of rollers mounted on said second sub-support so as to define a crevice therebetween in which the portion of the workpiece is restingly supported against downward and lateral movement; and a height adjustment mechanism constructed and arranged to permit a height of said second sub-support to be adjusted relative to said first sub-support.

10. The support as claimed in claim 9, further comprising a locking mechanism constructed and arranged to lock said second sub-support relative to said first sub-support.

11. The support as claimed in claim 10, wherein said locking mechanism comprises at least one set screw.

12. The support as claimed in claim 9, wherein said height adjustment mechanism comprises a screw disposed in a bore defined partly by a portion of said first sub-support and partly by a portion of said second sub-support, said portion of said second sub-support having threads engaged with said screw, said screw being axially fixed relative to said first sub-support.

13. The assembly as claimed in claim 7, wherein said bore extends along the vertical direction along which said second sub-support is slidably mounted.

14. The support as claimed in claim 12, wherein said bore extends along the vertical direction along which said second sub-support is movable.

* * * * *